United States Patent [19]

Gregg et al.

[11] Patent Number: 5,455,830
[45] Date of Patent: Oct. 3, 1995

[54] ERROR DETECTION AND RECOVERY IN PARALLEL/SERIAL BUSES

[76] Inventors: Thomas A. Gregg, 121 Bellevue Rd., Highland, N.Y. 12528; Gregory Salyer, 8 Sawood La., Woodstock, N.Y. 12498; Douglas W. Westcott, 84 Ackert Hook Rd., Rhinebeck, N.Y. 12572

[21] Appl. No.: 70,589

[22] Filed: Jun. 1, 1993

Related U.S. Application Data

[63] Continuation-in-part of Ser. No. 839,657, Feb. 20, 1992, Pat. No. 5,357,608.
[51] Int. Cl.⁶ .................. G06F 15/20; H04J 3/06
[52] U.S. Cl. .............. 371/1; 364/550; 370/103; 370/105.1
[58] Field of Search ............ 364/550; 370/103, 370/105.1; 371/1

[56] References Cited

U.S. PATENT DOCUMENTS

| | | | |
|---|---|---|---|
| 4,539,684 | 9/1985 | Kloker | 371/46 |
| 4,637,022 | 1/1987 | Burke et al. | 371/37 |
| 4,729,123 | 3/1988 | Wheen | 370/105.1 |
| 4,827,477 | 5/1989 | Avaneas | 371/37 |
| 4,959,833 | 9/1990 | Mercola et al. | 371/32 |
| 4,970,714 | 11/1990 | Chen et al. | 370/17 |
| 5,222,079 | 6/1993 | Rasor | 375/97 |
| 5,267,240 | 11/1993 | Bartow et al. | 371/1 |
| 5,313,501 | 5/1994 | Thacker | 371/1 X |

*Primary Examiner*—Edward R. Cosimano

[57] ABSTRACT

A system and method for asynchronously transmitting data blocks, in parallel, across multiple fibers in a serial manner. Frame groups are provided as a mechanism to transmit associated data serially on each fiber and tie the data being transmitted together. The frame groups do not have sequence numbers, therefore, the receiver determines which frames are part of a frame group by the arrival times of the individual frames. In one embodiment, the transceivers for each member of the parallel bus asynchronously achieve synchronism at each end of the fiber. Thus the need for a common clock is eliminated. The receivers on each side of the bus determine the relative skew for each conductor by performing skew measurements on a calibration message generated by the transmitters on the other side of the bus. When the skew on all conductors, viewed from both sides of the bus, has been determined, the skew values are exchanged across the bus, thus enabling the transmitters to set proper frame spacing.

18 Claims, 9 Drawing Sheets

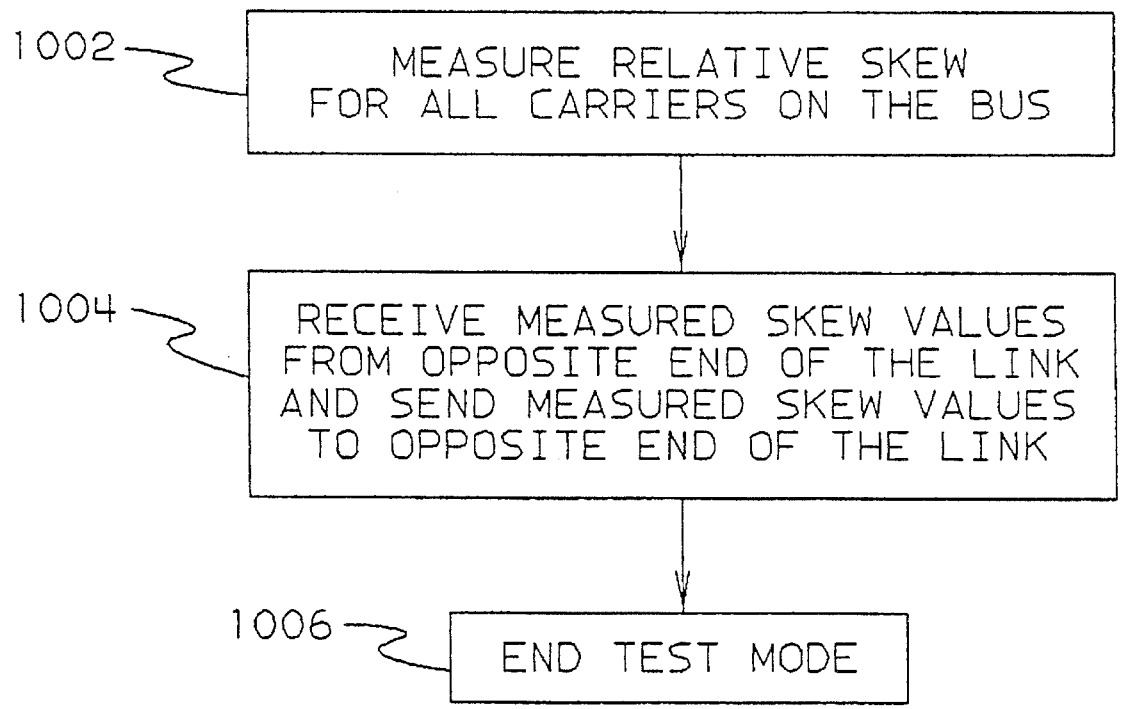

ERROR DETECTION AND RECOVERY IN PARALLEL/SERIAL BUSES

This application is a continuation-in-pad of U.S. patent application Ser. No. 07/839,657, filed Feb. 20, 1992 of Nell G. Bartow et al entitled "Configurable, Recoverable Parallel Bus" now U.S. Pat. No. 5,357,608.

This application is also related to U.S. Pat. No. 5,267,240 to Bartow et al. entitled "Frame Group Transmission and Reception for Parallel/Serial Buses".

This application is also related to U.S. patent application Ser. No. 07/839,652 filed Feb. 20, 1992 entitled "High Performance Channels for Data Processing Systems".

1. Field of the Invention

The present invention relates to data communications systems, and particularly to data communication systems using optical fibers to carry information and to a means for error detection and recovery for parallel/serial buses.

2. Cross Reference to Related Applications

This application is related to the following applications filed concurrently herewith:

The continuation-in-part of U.S. patent application Ser. No. 07/839,657, filed Feb. 20, 1992 of Nell G. Bartow et al entitled "Configurable, Recoverable Parallel Bus", now U.S. Ser. No. 08/071,146, filed Jun. 1, 1993;

The continuation-in-part of U.S. patent application Ser. No. 07/839,986 filed Feb. 20, 1992 entitled "Frame Group Transmission and Reception for Parallel/Serial Buses", now U.S. Ser. No. 08/071,115, filed Jun. 1, 1993;

U.S. Ser. No. 08/071,154, filed Jun. 1, 1993, by Nell G. Barrow et al entitled "Quiesce and Unquiesce Function for Intersystem Channels";

U.S. Ser. No. 08/070,587, filed Jun. 1, 1993, by Kenneth J. Fredericks et al entitled "Concurrent Maintenance of Degraded Parallel/Serial Buses";

U.S. Ser. No. 08/071,150, filed Jun. 1, 1993, by Daniel F. Casper et al entitled "Null Words for Pacing Serial Links to Driver and Receiver Speeds";

These co-pending applications and the present application are owned by one and the same assignee, International Business Machines Corporation of Armonk, N.Y.

The descriptions set forth in these co-pending applications are hereby incorporated into the present application by this reference.

BACKGROUND OF THE INVENTION

Fiber optics enable the transmission of long strings of data in a serial fashion from a driver to a receiver at long distances (kilometers) at very high data rates (billions of bits per second). This is in contrast to traditional electrical wires which allow data to be transmitted for only short distances at these data rates (10's of meters).

High performance computers require system buses between elements of a computing system to have even higher bandwidths (100's of millions of bytes per second). The use of a single fiber optic cable running at its maximum bandwidth can be insufficient to serve as a system bus between elements of a computing system.

In the prior art, a classical solution to the problem of inadequate bandwidth on a single carrier is to transmit the bits of each data word, in parallel, one over each of a plurality of carriers (a parallel bus). Another solution, known as striping, entails sending a plurality of serial data words, in parallel, one over each of a plurality of carriers. These solutions, however, share a common problem in that skew can develop between the parallel bits or words as they are sent over the bus.

Skew is a propagation time variation between the fastest and the slowest carrier. If not handled properly, such propagation time variations can cause data errors at the receiver. Skew can be caused by differences in the physical characteristics of the driver, receiver and transmission medium for each carrier of the bus.

There are two general categories of skew. One is random skew (RSKEW) and appears as jitter. Sources of this skew are due to clock synchronization and null word insertion. The other type of skew is systemic (SSKEW) in that one transceiver is always slower or faster than another by a fixed amount of time. Differences in carrier propagation times are a typical source of the systemic type of skew.

The transmitter, carrier, and receiver each introduce skew. Below is a description of how each of these elements introduces skew.

Transmission launch skew is the time difference between the start of frame of the earliest transmitter and the start of frame of the latest transmitter. This type of skew is measured at the transmitters. There are three sources of transmission launch skew. The first is random and is caused by the synchronization of the transmitter clock to the system clock. Where the all transmitter clocks are locked to a common reference clock, and there is a common system clock synchronization point, the launch skew can be as small as one bit time, or even less. The second source of transmission launch skew is also random and is caused by null insertion. The third source of transmission launch skew is systemic and is due to differences in internal signal propagation times from transceiver to transceiver. Any reasonable physical design should limit this skew to several bit times.

A significant amount of skew is caused by the characteristic of the carrier itself. The carrier skew is simply the difference in propagation times between the slowest and fastest carriers in a link. This skew is almost entirely systemic. Slight variations can occur over time due to environmental changes such as temperature. Thus, it should be understood that even if a plurality of frames are launched at the same time, they are likely to arrive at different times because of the carrier skew.

Skew can also be caused by the characteristics of the receiver. There are two sources of skew in the receiver. The first is random and is caused by the synchronization of the system clock to the receiver clock. The second source of receiver skew is systemic and is due to differences in internal signal propagation times between different transceivers. As with the transmitter, any reasonable physical design should limit this skew to several bit times.

To avoid data errors of the type which can be caused by skew, some means for synchronization of the parallel bits is conventionally employed. Traditional parallel bus designs use a common clock to achieve synchronization. This solution, while workable, is inefficient in that the common clock typically causes the data collection to be performed in lock step, at a speed limited by the total skew between the conductors.

Thus what is needed is an improved method for transmitting data words over a plurality of carriers such as multiple fiber optic filaments.

In prior ad, when the header for a frame is damaged, the frame is discarded and an operation recovery action is invoked usually after some time out has occurred. In prior art, when the information in a frame is damaged, a reject is sent by the receiver of the frame, and the frame is resent.

What is needed is the ability to resend a frame with a damaged header when more than one frames are associated with each other.

SUMMARY OF THE INVENTION

The present invention comprises a system and method for asynchronously transmitting data blocks, in parallel, across multiple carriers in a serial manner. Frame groups are provided as a mechanism to transmit associated data serially on each fiber and tie the data being transmitted together. The receiver is provided with a previously measured maximum skew value for a given link. Using this information, the receiver determines which frames are pad of a frame group by the arrival times of the individual frames.

According to an embodiment of the present invention, the transceivers for each member of the parallel bus asynchronously achieve synchronism at each end of the fiber. Thus the need for a common clock is eliminated. The receivers on each side of the bus determine the relative skew for each conductor by performing skew measurements on a series of calibration frames generated by the transmitters on the other side of the bus. When the skew on all conductors, viewed from both sides of the bus, has been determined, the skew values are exchanged across the bus, thus enabling the transmitters to set proper frame spacing.

Advantageously, skew measurement according to the present invention enables data to be sent across a link comprising a multi-carrier bus, limited only by the maximum bandwidth of the link itself rather than by the worst case theoretical skew. According to an embodiment of the present invention, data integrity is ensured by first measuring the relative skew values for the carriers in a link, at the time that the link is established or reinitialized. After the relative skew values have been determined, they are exchanged between both sides of the link and a connection is established having the start-to-start spacing of transmitted frames limited to the worst case (largest) skew value measured by the receivers. Since frames can be made very large, a significant amount of data can be sent across the link, at the maximum link bandwidth without concern for skew. Further, where large data frames are used, the bandwidth limiting effect of limiting the start-to-start frame spacing to the worst case skew value for a given link can be kept at a minimum.

According to the invention, a method for rejecting and retransmitting frames with damaged headers is described for frames that are pad of a frame group. Advantageously, control frame groups which have no information fields that have a damaged header do not need to be rejected and the command can be executed based on only a single undamaged frame of the frame group being received.

BRIEF DESCRIPTION OF THE DRAWINGS

The present invention will be better understood by reference to the drawing in which:

FIG. 10 is a flow chart summary of an alternative skew test/measurement procedure as viewed from a receiving end of the link.

FIG. 11 is an example of a replicated frame group consisting of link control words and link control CRC words only.

DESCRIPTION OF THE PREFERRED EMBODIMENT

Figure 1:
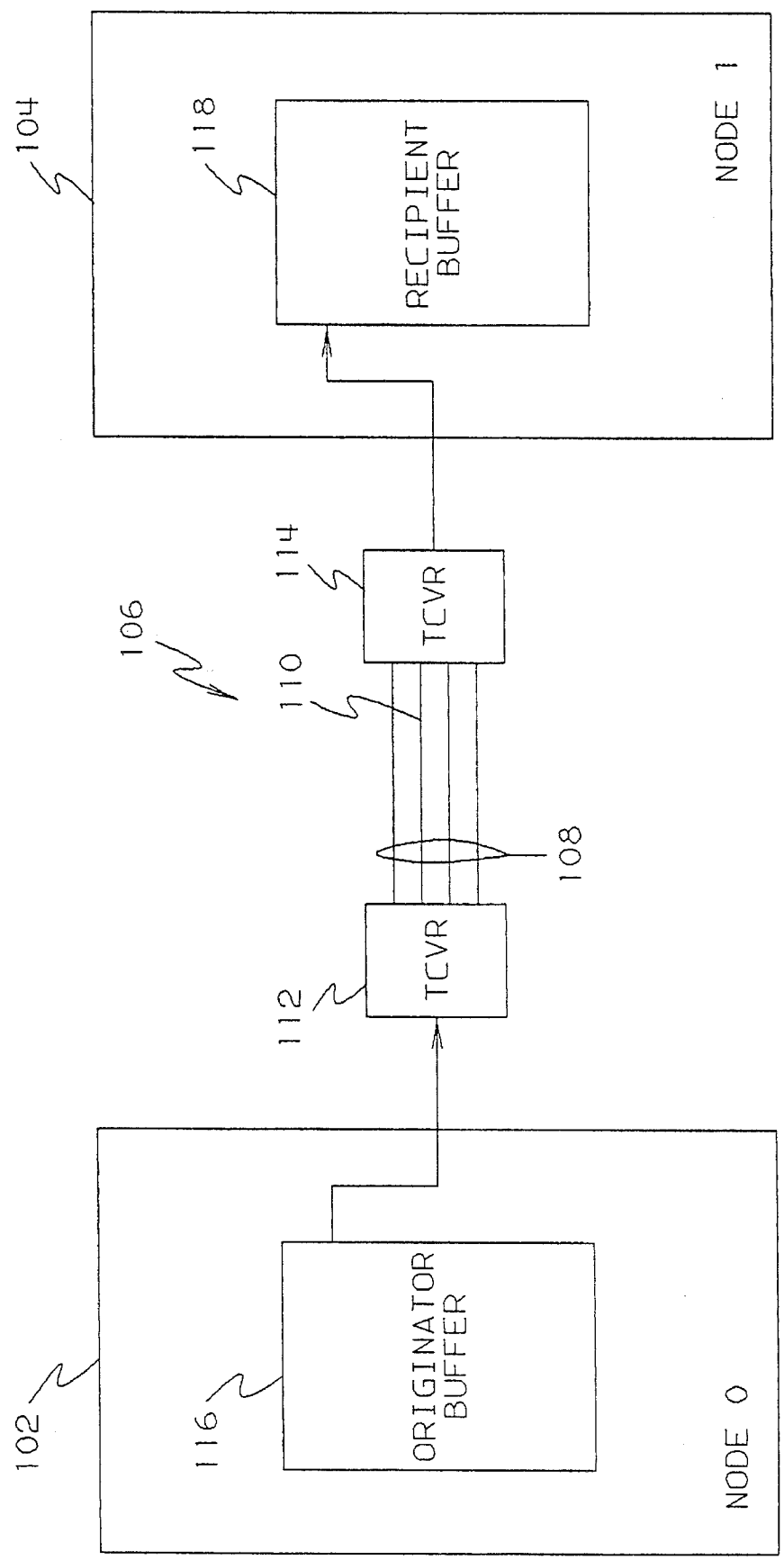
FIG. 1 is a block diagram of a physical link between two computing elements.

Turning first to FIG. 1, a physical link between two computing elements 102, 104 is illustrated. These elements could be, for example, two computers or a computer and a shared memory device. In any event, the computing elements 102, 104 are connected by way of an intersystem channel link 106 comprising a fiber optic bus 108. The fiber optic bus 108 is formed of multiple fiber pairs 110. Each fiber pair consists of two optical fibers, one for transmitting information and one for receiving information. While any number of fiber pairs can be used, exemplary values for intersystem channels would be a range of 1 to 64 fiber pairs in powers of two. The fiber pairs 110 of the fiber optic bus 108 are coupled to the computing elements 102, 104 by way of transceivers 112, 114 located at opposite ends of the bus. Each of the transceivers 112, 114 includes a transmitter unit and a receiver unit, both of which will be described in more detail later.

Data is sent across the link from an originator buffer 116 in a transmitting computing element. The received data is then collected and temporarily stored in a recipient buffer 118 in a receiving computing element. Although one buffer is shown in each of the computing elements of FIG. 1, it should be understood that a computing element can dynamically set up various numbers of originator and/or recipient buffers depending on the number and type of links to be established. The buffers 116, 118 can be of the "store-thru" type, meaning that they need not be filled before they are unloaded. This type of buffering has the advantage of lower transmission and reception latency times.

The information to be sent is divided up among the fiber pairs 110 that form the fiber optic bus 108. The information is sent from the originator buffer 116 to the recipient buffer 118 in the form of frames. Each frame is transferred on a single fiber of the bus 108. More information on configuration of the link and the structure of the buffers are contained, respectively, in copending applications entitled CONFIGURABLE, RECOVERABLE PARALLEL BUS to Bartow et al. (Ser. No. 07/839,657) and HIGH PERFORMANCE CHANNELS FOR DATA PROCESSING SYSTEMS to Bartow et al. (Ser. No. 07/839,652), both assigned to the same assignee as the present application and filed on even date herewith and both of which are incorporated by reference herein in their entireties.

Figure 2:
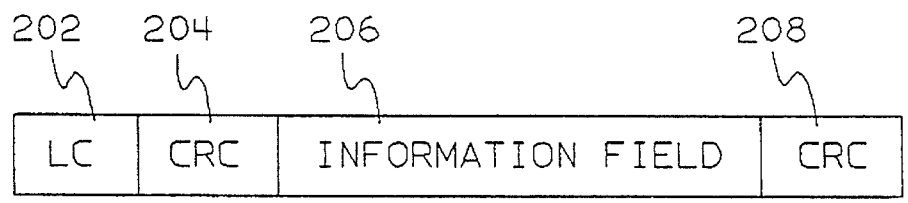
FIG. 2 is an illustration of the format of an exemplary frame.

The format of an exemplary frame is illustrated in FIG. 2. Each frame starts with a link-control word (LC) 202. Various fields in the link-control word 202 identify the frame format and type, designate a buffer area, and control the state of the transceiver and link.

A link-control-CRC (cyclical redundancy check) word 204 follows the link-control word. The link-control CRC word 204 is conventionally generated from the values in the link-control word. The link-control CRC word is checked at the receiver to test the validity of the link-control word in the incoming frame.

There are two types of frames, control frames and information frames. Control frames do not require an information field. They consist only of a link-control word and a link-control CRC word. An information frame has a link-control word 202 a link-control CRC word 204 and an information field 206. Information fields contain, for example, from one to 1,024 words. The information field is used to send information from a buffer area at one end of the link to a buffer area at the other end.

An information field is followed by an information-field CRC word 208. The information-field CRC word is conventionally generated from the values in the information field. The information field CRC word is checked at the receiver to test the validity of the information field in the incoming frame.

Figure 3:
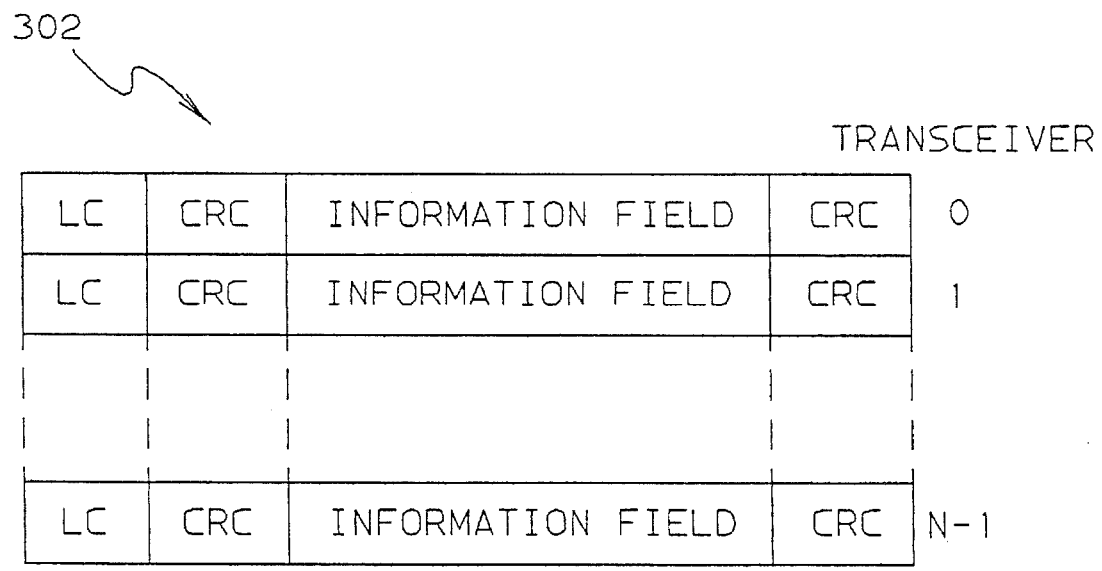
FIG. 3 is an illustration of the format of an exemplary frame group.

Related information can be placed in several frames, one on each transceiver of the operational link. These frames (referred to as a "frame group") are transmitted concurrently. There are can be as many frames in the group as there are transceivers in the operational link. FIG. 3 shows an exemplary frame group 302. The use of the frame group enables the data to be sent at a bandwidth that is multiples of the single fiber optic bandwidth since multiple frames (one per fiber) are transmitted simultaneously across the link.

Although not provided with sequence numbers, the link control words in each frame group are interlocked with those of subsequent and previous frame groups. The interlocking can be accomplished in a number of different ways. For example, each transmission may start with a request, followed by data, followed by an acknowledge. Each of these types of transmissions having a unique link control word. Further, a sending and/or recipient buffer address can be sent within the link control words. Thus data transmissions from (and/or directed to) different buffers will have different link control words.

In the preferred embodiment, frames associated with the same buffer and the same type of frame group may have the same link control words. For example a given message may include 16 data frames, 15 of which will have the same LC and one of which will have a distinct LC in that it includes a bit indicating the start of a buffer area. In this case, a lost frame among the 15 having an identical LC can not necessarily be detected by comparing the LCs in each received frame group. Instead, either the comparison of LCs in the last frame group will detect the problem because a frame belonging to the next frame group (of a different type and having a different LC) has been received, or the skew timer will expire (as described later). In either event, the receiver will detect that all data has not been received for the buffer area. This is accomplished by comparing the total number bytes actually received with the total transmitted byte count which is included as pad of every LC.

As an alternative embodiment, the transmitter can ensure that the link control words in each frame group are identical with each other, but are different than those in the immediately previous and subsequent frame groups.

Information from a originator buffer is sent across the link in one or more frame groups. When several frame groups are used to transmit the contents of one buffer, the frame groups may be sent in a sequence corresponding to the ascending order of the words in the buffer. For example, groups of lower numbered words are sent before groups of higher numbered words. When the operational link comprises more than one transceiver, the buffer contents are sent in units of words on a transceiver basis. That is to say, the words are distributed across the transceivers (and thus the fibers), modulo the number of transceivers in the link (e.g. transceiver 0 has word 0, 4, 8, 12 in a four transceiver operational link).

Figure 12:
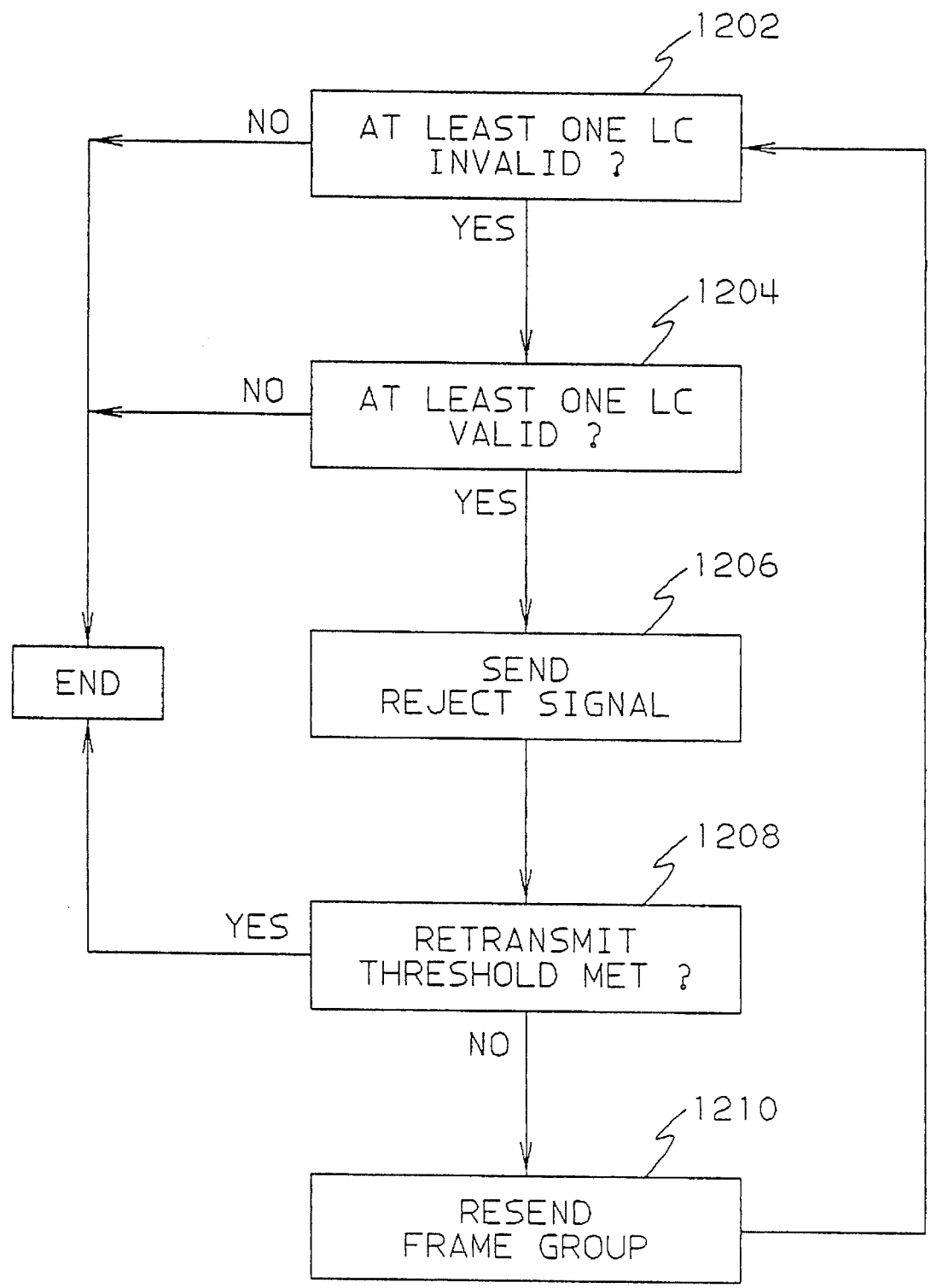
FIG. 12 is a flow diagram of link control word error procedure.

As illustrated in FIG. 12, when an error 1202 occurs in a link-control word of a frame group such as one of the LCs in FIG. 3, the damaged frame group is incomplete and may need to be discarded. If one or more of the remaining link control words is valid 1204, a reject is sent 1206, and the frame group is resent 1210. Rejects can be sent for frame groups based on:
1. A frame was received with a valid link-control word and the information field was invalid.
2. A frame group was received with one or more frames with an invalid link-control word and at least one frame of the frame group had a valid link-control word.

A link-control word is said to be invalid when one of the following conditions is true:
1. While the link-control word or link-control-word CRC was being received, an invalid transmission code was detected.
2. The link-control word has an invalid CRC.

When an invalid link-control word is detected on a transceiver, one of the following actions is taken, depending upon the transmission mode:
1. When all of the link-control words in the frame group are invalid, the entire frame group is discarded, and the request will experience a time out.
2. When one of the link-control words in the frame group is valid, one of the following actions is taken:
   A. For dispersed-frame-groups, a reject is generated from the valid link-control word and returned to the sender on all transceivers of the operational link. Dispersed frame groups contain differing information in each of the information fields of the frame group such as FIG. 3 shows.
   B. For replicated-frame-groups, the operation is performed using the valid link-control word. Replicated frame groups have no information fields and all of the link-control words are the same such as FIG. 11 shows.
   C. Or alternatively, no response is returned to the sender, ensuring that the request will experience a time out.

An information field is said to be invalid when one of the following conditions is true:
1. While the information field or information-field CRC was being received, an invalid transmission code was detected.
2. The information field has an invalid CRC.

When a frame has a valid link-control word and an invalid information field, a reject is returned to the sender on all transceivers of the frame group.

When the transmission mode is a dispersed-frame-group, each of the transceivers on the operational link should receive the same number of information field words. When there are no CRC errors or link-control-field errors but the number of words in each frame of the frame group is not the same, a reject is sent on all transceivers of the operational link.

The recognition of a reject causes the identified information to be resent for the entire information area starting with the first word of the information. This allows for the retransmission of the information without presenting an error to the operation that is sending the frames. If rejects are repeatedly received for an area and a retransmission threshold met 1208, then the retransmission of the area does not take place, and an error is reported.

The reject is returned on all of the transceivers of an operational link if any one of the transceivers of an operational link detects a reject condition. By using this design, errors in information fields and errors in link-control words are recovered for intermittent errors on serial/parallel buses.

According to an embodiment of the present invention, the transceivers for each carrier of the bus asynchronously achieve synchronism at each end of the fiber. Thus the need for a common clock is eliminated. Various means for synchronizing frames transmitted as serial data over a signal conductor are known in the art and thus will not be discussed in detail here. An example of such synchronization means is described in U.S. Pat. No. 4,970,714 to Chen et al. and assigned to the same assignee as the present invention.

Each fiber and its associated transmission and reception hardware has differing propagation characteristics which result in skew. Skew is the propagation time variation between the fastest and the slowest fiber. Reception of a start of a frame on any fiber causes the receiver to start checking for reception of the complete frame group and to reassemble the received frames of data in the recipient buffer. The receiver determines which frames are pad of a frame group by the arrival times of the individual frames and the contents of the link control words. If all of the frames of a frame group are not received within an established skew window or if the link control words received within the skew window are not identical, a skew error is recognized.

The skew rules, according to an embodiment of the present invention, set the skew window in which all frames of a frame-group must be received in order to receive a valid message. The rules also set the rate at which consecutive frame groups can be transmitted so that frames of one frame-group are not confused with frames of another frame-group. Further, examination of link control words for consistency within a given frame group protects the system from "lost frame" effects.

For a given link, the skew of frame groups measured at the receiver varies by plus or minus the random skew (RSKEW) component. The maximum RSKEW component is set by the design of the link hardware while the systemic skew (SSKEW) component is largely due to the optical cable installation. According to an embodiment of the present invention, a measurement of the total skew (the optical and random components) is made at the time the link is initialized to ensure that the it does not exceed set limits and further to ensure that frames belonging to a common frame group are properly identified as such by the receiver.

Figure 4:
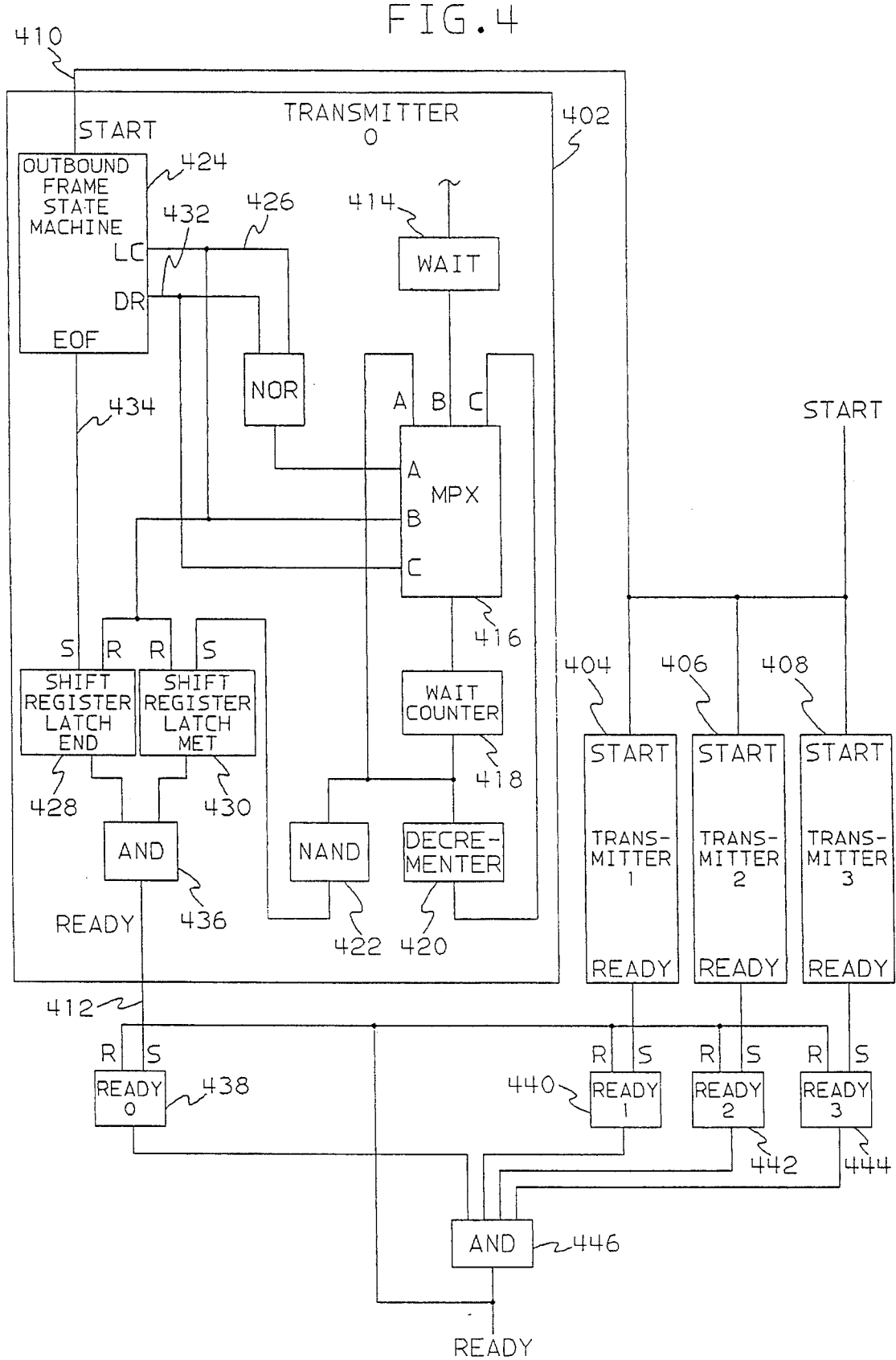
FIG. 4 is a logic diagram of an exemplary transmitter.

An exemplary transmitter unit according to an embodiment of the present invention is illustrated in FIG. 4. A four transceiver link is shown. The individual transmitters (one for each fiber optic carrier) are shown as XMIT0 402, XMIT1 404, XMIT2 406, and XMIT3 408. It should be understood that the transmitter of FIG. 4 can be operated using fewer than four carriers (e.g. 3, 2 or 1) by gating out selected transmit portions.

The internals of XMIT0 402 are shown. Along with the data paths (not shown), each transmitter has an input named START 410 which starts frame generation. Each transmitter also has an output called READY 412 which indicates that the current frame transmission has ended, and that the skew wait time has elapsed.

Within each transmitter there is a WAIT register 414 which is initialized at link initialization time. The value in the WAIT register 414 is the number of words which must be transmitted between LC (Link Control) words. The Wait register 414 is connected to a 3 input multiplexor (MPX) 416. The output of the MPX 416 is connected to a wait counter register (WCNTR) 418. The output of the WCNTR 418 is connected to decrementer (−1) 420, an 8 input nand circuit (=0) 422 detecting a value of zero in the WCNTR 418, and back to a first one (A) of the MPX 416 inputs (A–C). The output of decrementer 420 is connected to the third data input (C) of the MPX 416.

The channel starts a frame when all four transmitters are ready (i.e. all transmitters are idle and the minimum LC word to LC word spacing time has elapsed) by turning on the START line 410 for 1 cycle. This line causes each transmitter to begin frame transmission. When the Outbound Frame State Machine (OFSM) 424 sends the LC (indicated on line 426), the END 428 and MET 430 Shift Register Latches (SRLs) are reset, and the value in the WAIT register 414 is gated through the MPX 416 and the WCNTR 418. As words are sent on the link, the Data Request line (DR) 432 is active, and the WCNTR 418 is decremented via the decrementer 420 and MPX 416 circuits. The End Of Frame (EOF) may become active before, during, or after the WCNTR 418 reaches the value of zero. The EOF line 434 sets the END SRL 428, and the 8 input nand circuit 422 sets the MET SRL 430. When both SRLs 428, 430 are on, the output of the AND circuit 436 is active, and all conditions have been satisfied for the start of the next frame for that transceiver.

The READY lines 412 from the transmitters set the RDY0 438, RDY1 440, RDY2 442, and RDY3 444 SRLs. The outputs of these SRLs are connected to a 4 input AND circuit 446. When all 4 RDY SRLs are set, the output of the AND circuit 446 indicates that all 4 transmitters are ready to start the next frame. The output of this AND circuit 446 is also used to reset the RDY SRLs 438–444.

Figure 5:
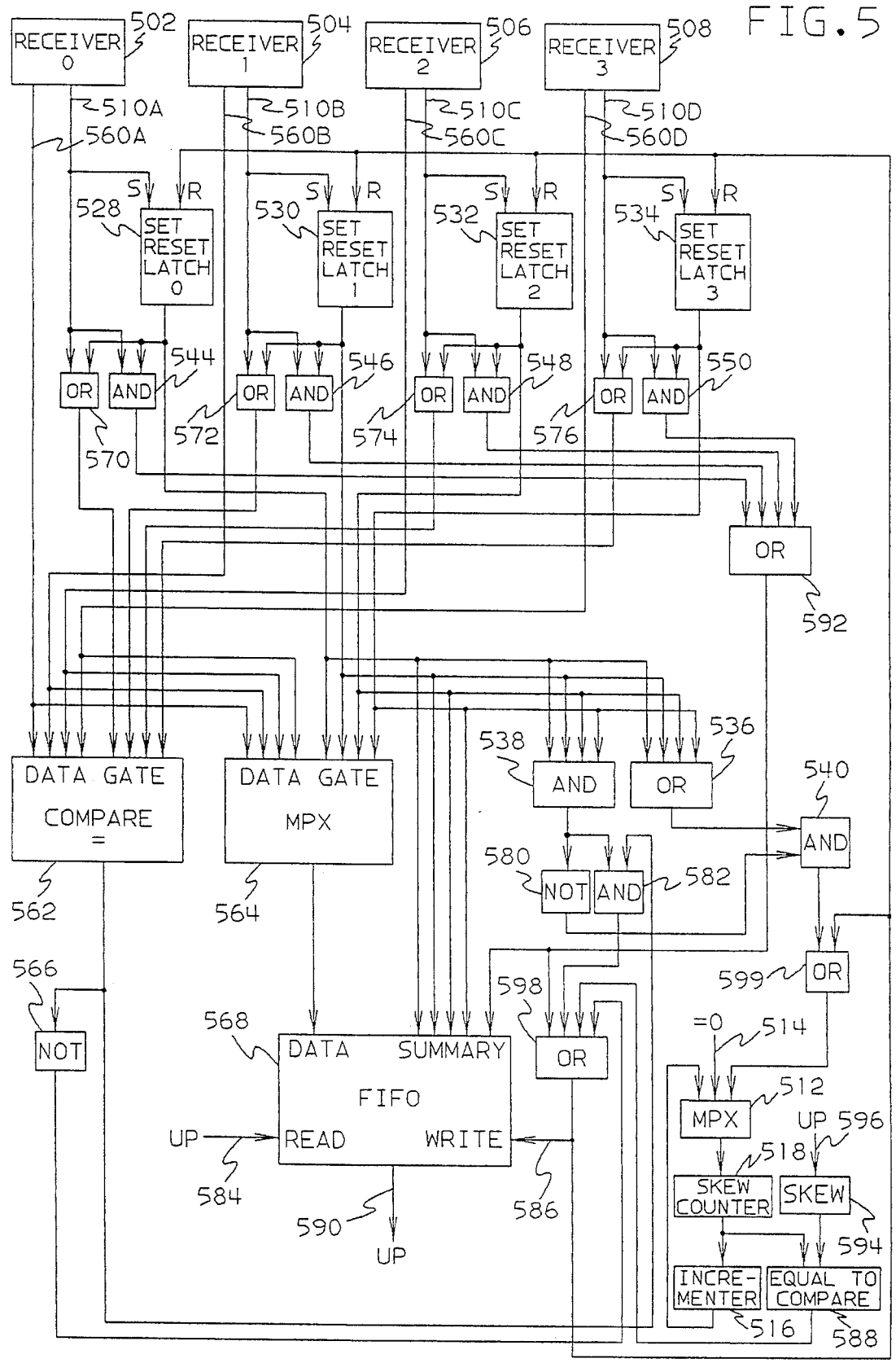
FIG. 5 is a logic diagram of an exemplary receiver.

An exemplary receiver unit according to an embodiment of the present invention is illustrated in FIG. 5. A four transceiver link is shown. The receivers are shown as RCV0 502, RCV1 504, RCV2 506, and RCV3 508. The data paths 560A, 560B, 560C, 560D from each receiver contain the current LC detected by the receiver. The output lines 510A, 510B, 510C, 510D are active for 1 cycle each time a new LC is detected by the corresponding receiver. The contents of the data paths 560A, 560B, 560C, 560D are compared by the gated compare logic (COMPARE) 562, and are also selected by the gated multiplexor (MPX) 564.

The Set-Reset latches (S-R latches) V0 528, V1 530, V2 532, and V3 534 are set by the respective lines 510A, 510B, 510C, 510D from the receivers. When a receiver detects a new LC, the corresponding S-R latch 528–534 is set. The four S-R latches 528–534 control the MPX 564, and are inputs to the first-in first-out buffer (FIFO) 568, a four input AND gate (A) 538, and a four input OR gate (O) 536. The four OR gates 570–576 each have two inputs. One input is a line 510A, 510B, 510C, 510D from a corresponding one of the receivers, and the other input is the output of a corresponding one of the S-R latches 528–534. The output of these OR gates 570–576 signal to the COMPARE 562 and determines which of the data paths to compare.

The skew measurement function is performed by a counter (SCNTR) 518 which is fed from a second multiplexor (MPX) 512. The second multiplexor 512 gates either a zero value 514 or the incremented value (+1) 516 to the skew counter-(SCNTR) 518. The SCNTR 518 is an eight bit register. The output of the SCNTR 518 feeds an equal-to compare circuit (=) 588 and the incrementer (+1) 516. The other input to compare 588 is from the output of a register (SKEW) 594. When the value in SCNTR 518 is equal to the value in SKEW 594, the output of the compare circuit 588 is active. The value in SKEW 594 is set by a microprocessor (not shown) over line 596.

The FIFO 568 stores an LC selected from one of the receivers along with summary information describing which of the receivers detected the LC. The write line 586 to the FIFO 568 is controlled by a four input or (O) circuit 598. The microprocessor reads entries in the FIFO 568 over a data bus 590 by activating the read line 584.

As with the transmitter unit, receivers for any of the carriers can be gated out of the system under control of the microprocessor via a control register (not shown).

Operation of an exemplary receiver unit according to an embodiment of the present invention as illustrated in FIG. 5 starts with the receipt of an LC by at least one of the receivers and finishes with a write operation to the FIFO 568. When the first LC is received by one or more of the receivers RCV0 502, RCV1 504, RCV2 506, and RCV3 508, the corresponding S-R latch 528–534 is set. The output of OR circuit 536 is activated which starts the increment of the SCNTR 518. When all four LC's are received, all four S-R latches 528–534 are set and the output of AND gate 538 is active (HIGH). This output feeds an inverter 580 which, in turn, feeds an AND gate 540. Thus, when AND gate 538 is active (HIGH) the output of AND gate 540 is deactivated (LOW) which, in turn, stops the SCNTR 518 through AND gate 540 and OR gate 599. If all LC's have been received and they all compare equal (as detected by COMPARE 562) the output of AND gate 582 is active. This output feeds OR gate 598 which, in turn, causes a write into the FIFO 568. Along with the LC from the MPX 564, summary information describing which receivers have an LC is also stored in the FIFO 568.

If an LC is damaged by transmission noise on the link, it is not detected by the receiver. When this happens the output of AND circuit 538 does not activate, and the SCNTR continues to count until its value reaches the value in SKEW 594. At this point, the output of the compare circuit 588 becomes active and it feeds OR circuit 598 which causes an entry to be made into the FIFO 568. In this situation, the summary information in the FIFO 568 indicates which of the receivers did not receive an LC.

Another possible result of a damaged LC is the apparent overlap of two different frame groups. Suppose that two frame groups reach the receivers with the minimum LC to LC spacing, and suppose that the first frame of the first group is damaged and discarded. In this case, the activation of the output of OR gate 536 is delayed until the next LC of the first frame group is received. This delay also starts the SCNTR 518 later. After all of the undamaged LC's have been received, the SCNTR 518 is still running. At this point the first frame of the second frame group may arrive. If the LC of this frame is different that the other LCs at the input of COMPARE 562, the output of COMPARE 562 will activate (since there is a non-compare of the LC's indicating that the LC's are from two different frame groups). An inverter (N) 566 detects the non-compare and feeds OR gate 598 which, in turn, causes a entry into the FIFO 568. The summary information indicates the LC and the receivers which detected this LC. The action of OR gates 570–576 bypasses the delay caused by the S-R latches 528–534 so that the LC which caused the non-compare is not included in the summary information.

OR gate 592 receives inputs from AND gates 544–550. Each of the AND gates 544–550 detects if its respective receiver receives an LC before the previous LC (from the same receiver) has been entered into the FIFO 568. Specifically, the AND gates 544–550 detect when a new LC is received (as indicated by lines 510A, 510B, 510C, 510D respectively) before the S-R latches 528–534 have been reset. This situation can occur only if the transmitter feeding the receivers does not obey the skew rules established at initialization time. The output of OR gate 592 feeds OR gate 598 which causes an entry to be made into the FIFO 568. The summary information includes the output of OR gate 592.

In all of the above situations, each time a FIFO 568 entry is made, the S-R latches 528–534 are reset. In the case of the LC non-compare, the S-R latch for the receiver which caused the non-compare is set even though the reset line is active. This is so because the S-R latches' set function overrides the reset function. Also, each time a FIFO 568 entry is made, the SCNTR 518 is reset to zero by the action of OR gate 599 and MPX 512.

It is noted that the transmitters 402–408 of FIG. 4 are not synchronized by a common clock. Similarly, the receivers 502–508 are also not synchronized with one another by a common clock. Instead, each time the link is established the transmitter and receiver pairs achieve synchronization with each other in an asynchronous manner, just as if they are connected by the only carrier in the link. Further, the receivers 502–508 use reception of the frames themselves, the skew rules and LC checking as described above to ensure that frames within the same frame group are properly identified as such. Advantageously, this eliminates the need for synchronizing hardware.

Figure 6:
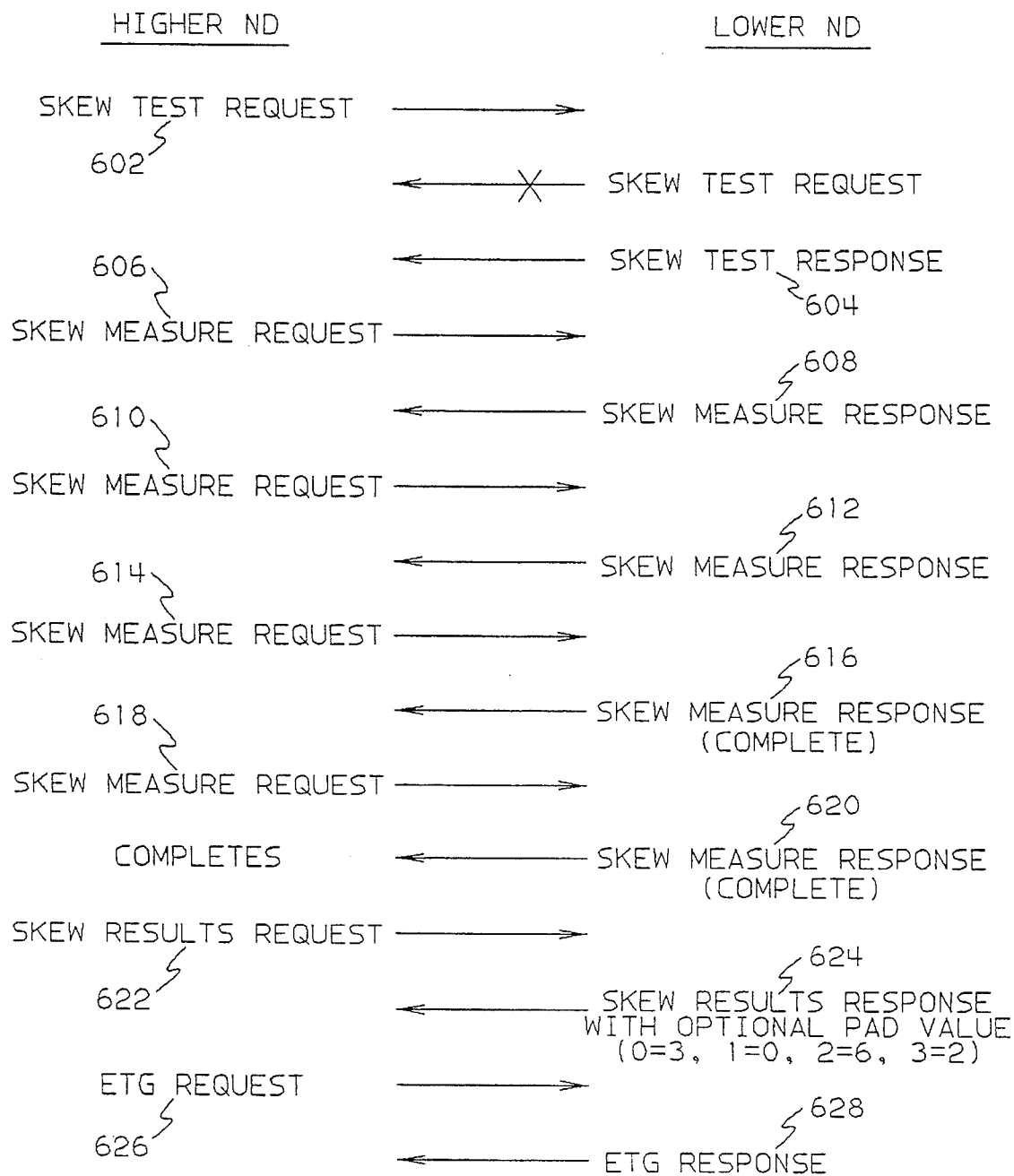
FIG. 6 is a flow diagram of a skew test procedure.

A flow diagram of a skew test/measurement procedure according to an embodiment of the present invention is illustrated in FIG. 6.

When skew measurements are to be performed, any transceiver may send a skew-test-request (STR) control frame 602 (or a replicated STR control frame) out on the link. By replicated, it is meant that an identical copy of a given frame (e.g. the STR frame) is transmitted on each carrier within a 2.5 word time transmit window. The skew-test-request frame includes a link control word identifying it as an STR. Nodes on both sides of the link may send out a skew test request at the same time. In this case, the node with the higher address becomes the master (i.e. controls the skew measurement procedure) and the node with the lower address becomes the slave. If only one node has sent the STR frame, it becomes the master and the recipient becomes the slave notwithstanding the relative node address.

Once a skew-test-request frame is received by any one of the receivers of the slave receiver unit (and the master slave relationship is established), the slave receiver unit places itself into a skew measurement mode (thereby causing its internal logic to respond as described below), resets its skew counter value to zero, and sets the skew register 594 to a predetermined initial value (e.g. 255). It should be understood, however, that another initial value could alternatively be chosen based on actual experience with a given system. The slave node then sends back a replicated skew-test-response control frame 604. This frame indicates to the master that the slave is ready to begin the skew measurement procedure.

In response to receipt of a skew-test-response frame, the master receiver unit also places itself into skew measurement mode, resets its own skew counter to zero, loads its skew register 594 with an initial value (e.g. 255) and sends out a replicated skew-measure-request (SMR) control frame 606.

When the first slave receiver(s) 502–508 receive the first skew-measure-request frame, the slave receiver unit determines whether all of the frames have arrived within the skew value indicated by the skew register 594. If not, the receiver unit's microprocessor checks the summary information in the FIFO 568 to determine which frame(s) were late (i.e. not received within the skew value indicated by the skew register 594). The receivers detecting the late frames are gated out and are not used in subsequent skew tests. The identity of these receivers and the skew register value is stored in the microprocessors local storage for later use. Next, a new value (e.g. 254) is loaded into the skew register and then the slave sends a replicated skew-measure-response control frame 608 across the link on all carriers (including those whose receivers have been gated out).

The skew-measure-response frame has the same effect on the master receiver unit as the skew-measure-request frame 606 has on the slave receiver unit. Specifically, the master determines which frames were received within the skew value indicated by its skew register 594, outgates the late receivers and loads a new skew value in its skew register. When this has been accomplished, the master sends a replicated skew-measure-request frame 610 across the link on all carriers.

In response to this skew-measure-request frame, the slave receive unit determines whether all of the frames (received on receivers that have not been gated out) have arrived within the new skew value cared by the skew register 594. If not, the slave receiver unit's microprocessor again checks the summary information in the FIFO 568 to determine which frame group(s) were late. The receivers detecting the late frames are gated out and are not used in subsequent skew tests. Also, the identity of the gated out receivers is also stored in the microprocessors local storage for later use. Next, a new value (e.g. 253) is loaded into the skew register and then the slave sends a replicated skew measure response control frame 612 across the link on all carriers (including those whose receivers have been gated out).

The above described process continues iteratively (e.g. 614) until a relative skew value has been determined for each receiver on both sides of the link (i.e. until all but one receiver has been gated out or the skew register has been decremented to zero). When the slave has measured the relative skew for all receivers, it sets a bit in the skew measure response frame 616 indicating that the measurement is complete. When the master determines that skew measurements on both sides of the link are complete, it sends a skew-results-request (SRR) control frame 622 across the link. In response, the slave sends a skew results response control frame 624 (one on each carrier) back across the link. These frames include the measured skew values for the slave receivers (e.g. carrier 0=1, carrier 1=0, carrier 2=6, carrier 3=2). Each of the skew values is indicative of a number of word transmit times (e.g. 2=2 word transmit times). It should be understood that the skew measurements are all made relative to the fastest carrier(s). Thus the fastest carrier(s) (i.e. the first to arrive across the link) will always have a relative skew value of zero. The skew value returned in the skew results response may also include a padding value added to each measurement. This padding value can be used to compensate for random skew (jitter).

Once the skew-results-response frame has been received, the master can send an establish-transceiver-group (ETG) control frame 626. This request is used by the originating (master) node to elicit responses from the set of transceivers at the recipient (slave) node and also to set the intended link (the set of carriers that will be used to establish communications) at the slave. The request is sent as a replicated frame on all of the carriers that have passed the skew test (e.g. have a relative skew value of 254 or less). The parameter field of the ETG request contains the largest of the skew values determined by the master receivers. The master can also add a pad value in a similar manner as the slave (in sending the skew results response). This value determines the link-control-word to link-control-word spacing that is required for any frame groups that are to be sent by the slave.

In response to the ETG request, the slave sends an ETG response frame 628 (which is replicated on carriers on which the ETG request was received). The master node checks the ETG response to ensure that it has been received on each of the carrier's on which the ETG request was sent. If the master node receives the ETG responses an all transceivers of the intended link, the link is established using the carriers designated by the ETG frames. If not, a link can be retried or established using a subset of the carriers comprising those which are operational. In that event, the master sends another skew results request to the slave and the slave again responds with the previously measured skew. Only the maximum skew on the intended link carriers is used to determine the minimum frame spacing.

Figure 9:
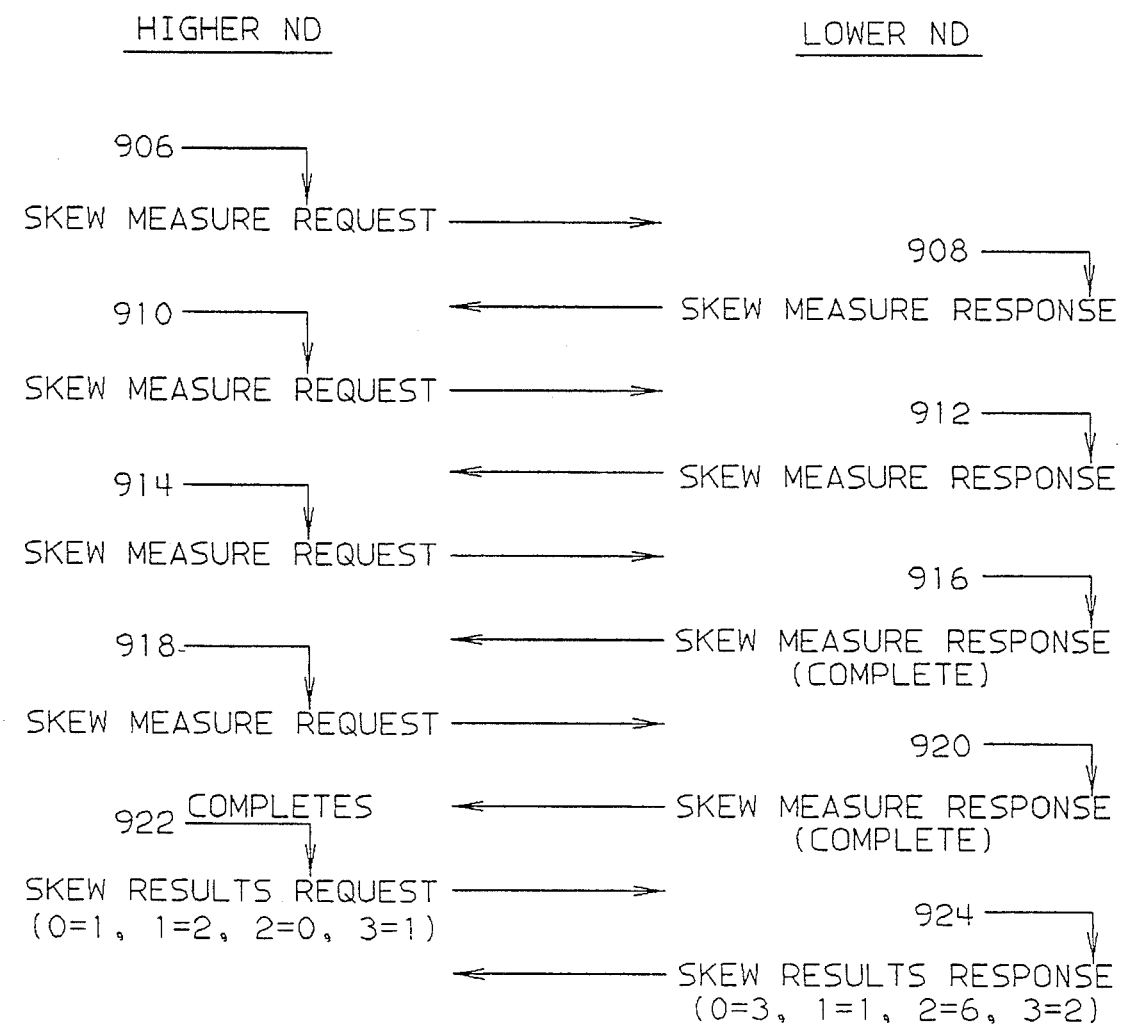
FIG. 9 diagram of an alternative skew test procedure. Like reference numerals appearing in more than one Figure designate like elements.

A flow diagram of an alternative skew test/measurement procedure according to an embodiment of the present invention is illustrated in FIG. 9. Note that NE is Node Descriptor.

When skew measurements are to be performed, a transceiver may send a skew-measure-request (SMR) control frame 906 (or a replicated SMR control frame) out on the link. By replicated, it is meant that an identical copy of a given frame (e.g. the SMR frame) is transmitted on each carrier within a 2.5 word time transmit window. The skew-measure-request frame includes a link control word identifying it as an SMR. Only the node that is the master may send out a skew measure request. The master may be determined by being the node with the higher address (i.e. controls the skew measurement procedure) and the node with the lower address becomes the slave, or may be assigned by design conventions.

The first time that a skew-measure-request frame is received by any one of the receivers of the slave receiver unit (and the master slave relationship is established), the slave receiver unit places itself into a skew measurement mode (thereby causing its internal logic to respond as described below), resets its skew counter value to zero, and sets the skew register 594 to a predetermined initial value (e.g. 255). It should be understood, however, that another initial value could alternatively be chosen based on actual experience with a given system. The slave node then sends back a replicated skew-measure-response control frame 908. This frame indicates to the master that the slave is ready to begin the skew measurement procedure.

When the master unit sends the first skew-measure-request frame, the master receiver unit also places itself into skew measurement mode, resets its own skew counter to zero, loads its skew register 594 with an initial value (e.g. 255) and sends out the first replicated skew-measure-request (SMR) control frame 910.

When the first slave receiver(s) 502–508 receive the next skew-measure-request frame, the slave receiver unit determines whether all of the frames have arrived within the skew value indicated by the skew register 594. If not, the receiver unit's microprocessor checks the summary information in the FIFO 568 to determine which frame(s) were late (i.e. not received within the skew value indicated by the skew register 594). The receivers detecting the late frames are gated out and are not used in subsequent skew tests. The identity of these receivers and the skew register value is stored in the microprocessors local storage for later use. Next, a new value (e.g. 254) is loaded into the skew register and then the slave sends a replicated skew-measure-response control frame 912 across the link on all carriers (including those whose receivers have been gated out).

The skew-measure-response frame has the same effect on the master receiver unit as the skew-measure-request frame has on the slave receiver unit. Specifically, the master determines which frames were received within the skew value indicated by its skew register 594, outgates the late receivers and loads a new skew value in its skew register. When this has been accomplished, the master sends a replicated skew-measure-request frame across the link on all carriers.

In response to this skew-measure-request frame, the slave receiver unit determines whether all of the frames (received on receivers that have not been gated out) have arrived within the new skew value indicated by the skew register 594. If not, the slave receiver unit's microprocessor again checks the summary information in the FIFO 568 to determine which frame group(s) were late. The receivers detecting the late frames are gated out and are not used in subsequent skew tests. Also, the identity of the gated out receivers is also stored in the microprocessors local storage for later use. Next, a new value (e.g. 253) is loaded into the skew register and then the slave sends a replicated skew measure response control frame across the link on all carriers (including those whose receivers have been gated out).

The above described process continues iteratively (e.g. 914) until a relative skew value has been determined for each receiver on both sides of the link (i.e. until all but one receiver has been gated out or the skew register has been decremented to zero). When the slave has measured the relative skew for all receivers, it sets a bit in the skew measure response frame 916 indicating that the measurement is complete. When the master determines that skew measurements on both sides of the link are complete 918, 920, it sends a skew-results-request (SRR) control frame 922 across the link. In response, the slave sends a skew results response control frame 924 (one on each carrier) back across the link. These frames include the measured skew values for the slave receivers (e.g. carrier 0=1, carrier 1=0, carrier 2=6, carrier 3=2) and master receivers (e.g. carrier 0=1, carrier 1=2, carrier 2=0, carrier 3=1). Each of the skew values is indicative of a number of word transmit times (e.g. 2=2 word transmit times). It should be understood that the skew measurements are all made relative to the fastest carrier(s). Thus the fastest carrier(s) (i.e. the first to arrive across the link) will always have a relative skew value of zero. The skew value returned in the skew results may also include a padding value added to each measurement. This padding value can be used to compensate for random skew (jitter). This value determines the link-control-word to link-control-word spacing that is required for any frame groups that are to be sent by the master.

Once the skew-results-request frame has been received, the slave tests the skew results to determine the set of transceivers that are within the maximum allowed skew at both ends of the link and comprise an allowed intended operational link. The set of transceivers that meets this test becomes the operational link. The slave can indicate non-acceptance of an operational link by a bit in the parameter field.

Once the skew-results-response frame has been received, the master tests the skew results to determine the set of transceivers that are within the maximum allowed skew at both ends of the link and comprise an allowed intended operational link. The set of transceivers that meets this test becomes the operational link. The slave can indicate non-accepatnce of the operational link by a bit in the parameter field.

The parameter field of the SRR request contains the largest of the skew values determined by the master receivers. The master can also add a pad value in a similar manner as the slave (in sending the skew results response). This value determines the link-control-word to link-control-word spacing that is required for any frame groups that are to be sent by the slave.

Advantageously, the skew measurement method according to an embodiment of the present invention can determine the total skew including the systemic (SSKEW) and random (RSKEW) elements thus reducing or eliminating the need for pad values depending on the confidence level required. In such an embodiment, the operation of each carrier at a given skew value (in the skew register 594) is verified by repeating the skew test a multiplicity of times (e.g. 100) at that value. If a carrier can not pass the skew test even once (i.e. a replicated frame is not received within the tested skew window), it is considered to not be within the tested skew window as indicated by the skew register.

Figure 7:
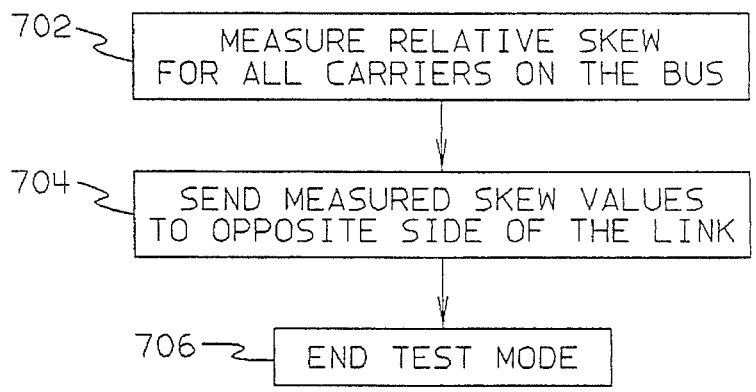
FIG. 7 is a flow chart summary of the skew test/measurement procedure as view from a receiving end of the link.

A summary of the skew test/measurement procedure as viewed from a receiving end of the link is illustrated in FIG. 7 and FIG. 10. Once the receiver unit is in skew measurement mode, in steps 702 and 1002 it measures the relative skew for all carriers on the bus. Once the measurements have been accomplished on both sides of the link, in steps 704 and 1004 the measured worst case skew values are exchanged across the link. In the case of a slave node, the measured skew values for each carrier are sent across the link to the master. Finally, in steps 706 and 1006, once the exchange is complete, the receiver unit ends skew test/measurement mode and awaits a command from the system or link.

Figure 8:
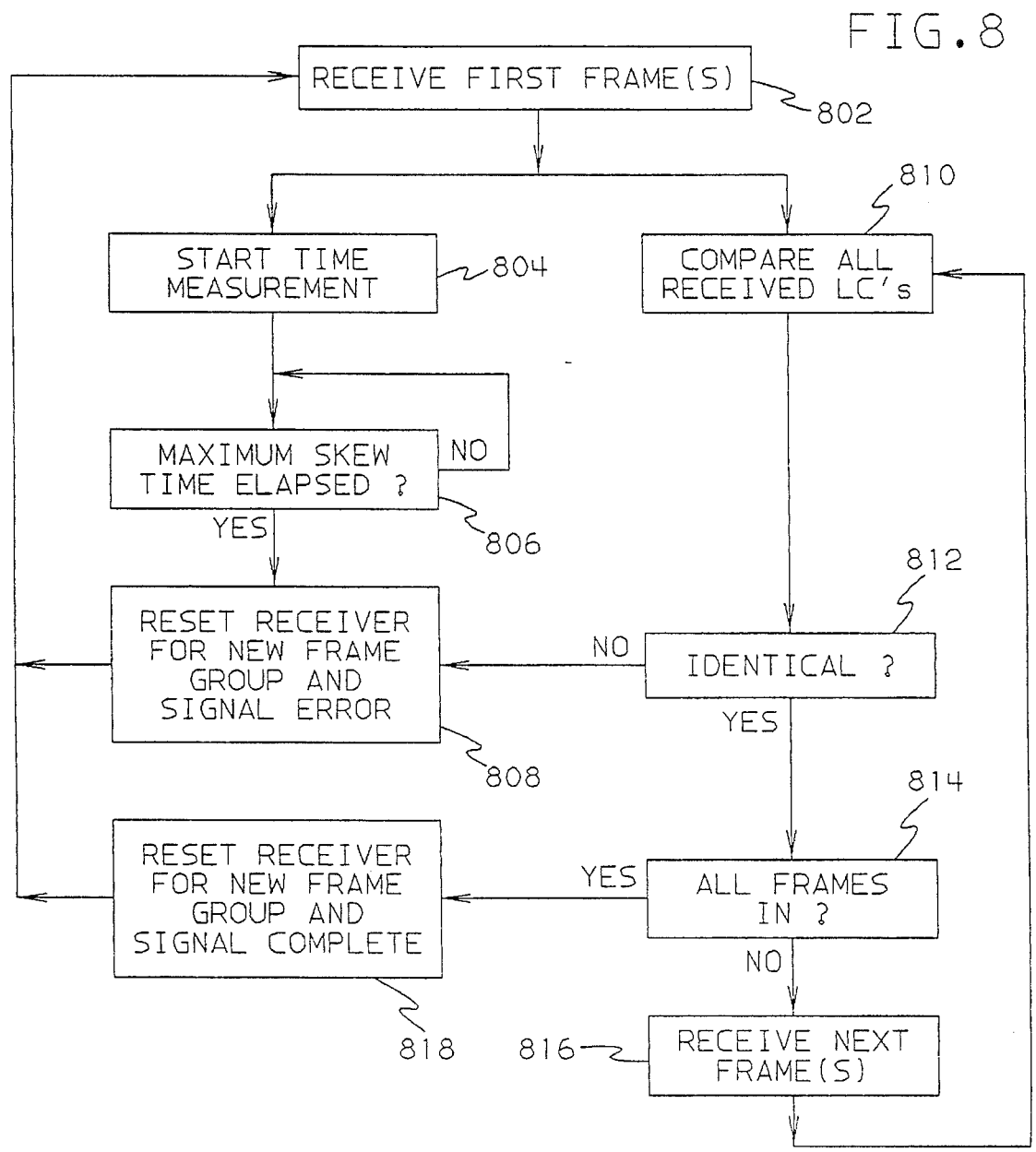
FIG. 8 is a flow chart of frame reception and frame group integrity checking in a receiver according to an embodiment of the present invention.

A summary of the method used by the receiver unit to receive and verify a frame group is illustrated in FIG. 8. In step 802 the receiver unit receives the first frame or frames in a frame group. In response, in step 804 the receiver unit starts its skew counter to measure elapsed word times and continuously compares the elapsed time against the maximum measured skew value for the established link. If at any time before all frames have been received (or an error has been detected), the elapsed time matches the worst case skew value (as detected in step 806), in step 808 the receiver unit is reset to receive a new frame group (which includes resetting the skew counter) and an error is reported.

In parallel, in step 810, as frames arrive their link control words are compared to ensure that they are all identical. If any newly arrived link control word does not match those for the other received frames (detected in step 812) in step 808 an error is signaled and the receiver unit is reset to receive a new frame group 802. The non-comparing frames are considered to be part of the new frame group and are treated by the receiver as such.

If the newly arrived frames compare, a test is made in step 814 to determine whether all the frames in the frame group have been received. This is a matter of comparing the active carriers, as indicated by the receiver unit's control register, with the received and properly comparing frames. If all frames have not yet been received, in step 816 the receiver continues to wait for additional frames to be received and continues the comparison and time measurement process as described above. If all frames have been received before the worst case measured skew time has elapsed, in step 818 the receiving end of the link signals complete and the receiver is reset to receive the next frame group 802.

In summary, according to an embodiment of the present invention, the skew rules are as follows:

All transceivers must start transmission of the link-control word (LC) within 2.5 word transmission times across all of the drivers sending a frame group. A word transmission time is the amount of time it takes to launch (transmit on to the link) a word of information (32 data bits plus 8 bits of encoding information in the present embodiment).

Start-to-start spacing of link-control words of back-to-back frames on a single driver may be no closer than the value that is established during the skew test procedure. The start-to-start frame spacing is contained in the establish-transceiver-group request or the largest skew value returned in the skew results response frames. Alternatively, the start-to-start frame spacing is the largest skew value for the operational link contained in the skew results request or the largest skew value for the operational link returned in the skew results response frames.

If a link control word is received on a single receiver with less separation from the previous link control word than the start-to-start frame spacing as determined above, the frame is discarded as described by the function of OR gate 592.

Transceivers check to see that link-control words for each frame group are received within a predetermined time span from arrival of the first frame on the link. The length of the time span is specified by the maximum measured (worst case) skew value as determined by the skew test and can be optionally padded with a model dependant value that allows for long term jitter. The checking is performed only on the transceivers that are the members of the intended link as defined by the ETG request frame group sent or received and recognized. If the alternative method is used, The checking is performed only on the transceivers that are the members of the intended link as defined by the skew results request and skew results response.

If a frame group is received with a skew error, the frame group is rejected, or discarded as appropriate. Transceivers that fail a skew check are logged out for maintenance purposes.

Many variations and modifications which do not depart from the scope and spirit of the invention will now become apparent to those of skill in the art. Thus, it should be understood that the above described embodiments have been provided by way of example rather than as a limitation.

What is claimed is:

1. A communications system comprising:

an information transmission medium comprising a plurality of carriers;

a first node comprising a transmitter unit including a plurality of transmitters;

a second node comprising a receiver unit including plurality of receivers, each of the receivers being coupled to a corresponding one of said of the transmitters by way of a different one of the carriers;

the receiver unit comprising means for measuring a relative skew on each of the carriers and for providing a highest skew value to the first node;

the transmitter unit comprising means for transmitting a plurality of frames including link control words in the frames as a group of frames, in parallel, over the carriers and for ensuring that the start of back-to-back frames transmitted over the carriers are separated by no less than the highest skew value; and means for causing a reject signal to be sent and a frame group resent if any link control word is invalid and at least one link control word of the frame group is valid.

2. A communications system according to claim 1 wherein the detection of an invalid transmission code during receipt of the link control word constitutes an invalid control word.

3. A communications system according to claim 1 wherein an invalid link control CRC value constitutes an invalid control word.

4. A communications system according to claim 1 wherein the detection of an invalid transmission code during receipt of a link control word CRC constitutes an invalid control word.

5. A communications system according to claim 1 wherein the detection of an invalid transmission code during receipt of an information field CRC constitutes an invalid information field.

6. A communications system according to claim 1 including means for resending the rejected data areas based on said rejects being repeatedly received; and performing said reject resends up to a maximum number of times.

7. A communications system according to claim 6 wherein a reject is sent and the frame group resent if any information field is invalid and at least one link control word of the frame group is valid.

8. A communications system according to claim 7 wherein the detection of an invalid transmission code during receipt of the information field constitutes an invalid information field.

9. A communications system according to claim 7 wherein an invalid information field CRC value constitutes an invalid information field.

10. A communications system comprising:

an information transmission medium comprising a plurality of carriers;

a first node comprising a transmitter unit including a plurality of transmitters;

a second node comprising a receiver unit including plurality of receivers, each of the receivers being coupled to a corresponding one of said of the transmitters by way of a different one of the carriers;

the receiver unit comprising means for measuring a relative skew on each of the carriers and for providing a highest skew value to the first node;

the transmitter unit comprising means for transmitting a plurality of frames including link control words in the frames as a group of frames, in parallel, over the carriers and for ensuring that the start of back-to-back frames transmitted over the carriers are separated by no less than the highest skew value; and means for causing execution of a command in a link control word in a replicated frame group if one or more link control words in the replicated group is invalid, but at least one link control word of the frame group is valid.

11. The system of claim 10 wherein said first node further comprises: means for ensuring that all of the frames in the plurality are transmitted within a predetermined time window.

12. The system of claim 10 wherein the receiver unit comprises means for determining when a first frame in the plurality of frames has been received and for determining whether remaining frames in the plurality of frames have been received within a time period from reception of the first frame, said time period being defined by the highest skew value.

13. The system of claim 10 further comprising means for determining when a first frame in the plurality of frames has been received and for determining whether remaining frames in the plurality of frames have been received within a time period from reception of the first frame, said time period being defined by the highest skew value plus a constant pad value.

14. The system of claim 10 wherein each of said frames comprises a link control word and wherein said receiver unit further comprises means for determining whether link controls words of said plurality of frames are identical with one another.

15. The system of claim 10 wherein the receiver unit comprises group determination means for determining whether received frames are all within the plurality of frames transmitted in parallel by the first node.

16. The system of claim 10 wherein the first and second nodes are each computers.

17. The system of claim 10 wherein the carriers are optical fibers.

18. A communications system comprising:
an information transmission medium comprising a plurality of carriers;
a first node comprising a transmitter unit including a plurality of transmitters;
a second node comprising a receiver unit including plurality of receivers, each of the receivers being coupled to a corresponding one of said of the transmitters by way of a different one of the carriers;
the receiver unit comprising means for measuring a relative skew on each of the carriers and for providing a highest skew value to the first node;
the transmitter unit comprising means for transmitting a plurality of frames including frame headers and link control words in the frames as a group of frames, in parallel, over the carriers and for ensuring that the start of back-to-back frames transmitted over the carriers are separated by no less than the highest skew value; and
means for rejecting and retransmitting frames with damaged headers for frames that are part of a frame group.

* * * * *